United States Patent
Confer et al.

(10) Patent No.: US 9,569,350 B2
(45) Date of Patent: Feb. 14, 2017

(54) MULTIDIMENSIONAL RESOURCE MANAGER/ALLOCATOR

(71) Applicant: Samsung Electronics Co. Ltd., Suwon-si, Gyeonggi-do (KR)

(72) Inventors: William James Confer, Clinton, NY (US); Gustavo Marin, Somerset, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 13/796,168

(22) Filed: Mar. 12, 2013

(65) Prior Publication Data

US 2014/0281340 A1    Sep. 18, 2014

(51) Int. Cl.
*G06F 12/02* (2006.01)
*G06F 9/38* (2006.01)
*G06F 17/17* (2006.01)

(52) U.S. Cl.
CPC ......... *G06F 12/023* (2013.01); *G06F 12/0207* (2013.01); *G06F 9/3895* (2013.01); *G06F 17/175* (2013.01)

(58) Field of Classification Search
CPC ... G06F 9/3895; G06F 12/0207; G06F 17/175
See application file for complete search history.

(56) References Cited

U.S. PATENT DOCUMENTS

| | | | | |
|---|---|---|---|---|
| 3,624,616 A * | 11/1971 | Patel | | 711/200 |
| 4,603,348 A * | 7/1986 | Yamada et al. | | 358/500 |
| 6,154,823 A * | 11/2000 | Benayon | | G06F 12/023 |
| | | | | 711/170 |
| 6,806,891 B1 * | 10/2004 | Manuel et al. | | 715/763 |
| 8,788,749 B2 * | 7/2014 | Hall | | G11B 5/012 |
| | | | | 711/112 |
| 2005/0104890 A1* | 5/2005 | Champion | | 345/531 |
| 2008/0005522 A1* | 1/2008 | Paladini et al. | | 711/170 |
| 2011/0246742 A1* | 10/2011 | Kogen | | G06F 9/5016 |
| | | | | 711/170 |

* cited by examiner

*Primary Examiner* — Charles Rones
*Assistant Examiner* — Tian-Pong Chang
(74) *Attorney, Agent, or Firm* — Jefferson IP Law, LLP

(57) ABSTRACT

An apparatus and method for multidimensional resource allocation and management are provided. The method includes receiving a request for allocation of a block of a multidimensional memory resource, selecting a grid for tracking spaces of the multidimensional memory resource according to the allocation request, determining whether a block of the multidimensional memory resource corresponding to the request for the allocation of the block of the multidimensional memory resource is unallocated, and allocating the unallocated block of the multidimensional memory resource.

9 Claims, 6 Drawing Sheets

MULTIDIMENSIONAL RESOURCE MANAGER/ALLOCATOR

BACKGROUND OF THE INVENTION

1. Field of the Invention

The present invention relates to an apparatus and method for multidimensional memory resource management and allocation. More particularly, the present invention relates to an apparatus and method for memory resource management and allocation of multidimensional memory spaces in an efficient manner that does not exceed overlap constraints for the multidimensional memory spaces.

2. Description of the Related Art

Computing devices and electronic devices having computing capabilities, such as Personal Computers (PCs), laptops, mobile terminals, portable electronic devices, electronic books, personal media players, smart appliances, and a wide variety of other devices having computing capabilities have become ubiquitous. Additionally, consumer demand for increasing computing and/or processing capabilities of such devices has rapidly increased as communication networks and bandwidth have increased and as portability and capabilities of the computing and electronic devices have increased. Accordingly, there is a need for increased performance for memory and more efficient management of memory resources, included in the computing and electronic devices.

Managing allocated and/or unallocated blocks of a 1-Dimensional (1D) memory resource according to the related art may be a relatively simple task because both the 1D memory resource and the allocated and/or unallocated blocks are organized in a linear manner. Thus, a 1D memory manager may efficiently find available memory resources for a memory request of an arbitrary size because the 1D memory manager starts allocation with the entirety of the 1D memory resource being available, and sequentially breaks up no more than one block of unallocated blocks for each allocation request. Thus, in the case of the 1D memory resource, for each allocation, only a trivial amount of work may be needed in order to maintain a list of unallocated resources in a quasi and/or fully sorted order, thus allowing for any subsequent search for available memory resources of an appropriate size to be done quickly.

Because the allocated and/or unallocated blocks of the 1D memory resource are disposed in a linear manner in which the 1D memory resource is also organized, then in a case where block edges touch or overlap, a resulting high-level map of allocated and/or unallocated blocks is in a form of lines, or in other words, is linear. However, such linear features are unique to 1D resources, and thus, allocation schemes and memory managers for 1D memory resources may be inadequate for efficient allocation of memory resources in a multidimensional memory resource. Additionally, the allocation schemes and memory managers for 1D memory resources may be especially inadequate in a 2 Dimensional (2D) system, such as a graphics display, which are physically manipulated in a 1D memory resource.

For example, in a case where pixels of a 2D canvas for a graphics display are organized linearly in a 1D memory resource, the neighboring pixels in a same row are sequentially located in the 1D memory resource, but neighboring pixels located in different, but adjacent, rows may be completely disconnected in a linear structure of the 1D memory resource. Thus, in such a case, if an allocation of a block having an arbitrary 2D shape, even a simple shape such as a rectangle, is requested, the 1D memory manager, and/or the 1D memory allocation scheme, may fail to efficiently locate unallocated blocks.

FIGS. 1A and 1B illustrate a 2D canvas of pixels allocated according to a 1D memory allocation scheme according to the related art.

Referring to FIGS. 1A and 1B, the 2D canvas 101 of a memory resource may have a height of 12 pixels and a width of 12 pixels, and has a first block 102 and a second block 103 of allocated pixels such that a total of 13 pixels are allocated. In the 2D canvas 101, when an allocation of a block of 5×5 pixels is requested, a 1D memory allocator may not find an appropriately sized unallocated block, from among the unallocated blocks 104 to 108 shown in FIG. 1B, in order to support the requested allocation of the block of 5×5 pixels. That is, because of the first block 102 and the second block 103, being disposed in the manner shown in FIG. 1A, the 1D memory allocator may only accommodate the request for the block of 5×5 pixels by allocating portions of at least three of the unallocated blocks 104 to 108 shown in FIG. 1B.

In order to address the above noted problems illustrated in FIGS. 1A and 1B, and in order to address needs of multidimensional memory resources, such as those used in display devices, that are linearly organized, multidimensional resource managers and/or allocators are needed in order to efficiently allocate resources for arbitrary shapes. An example of such resource allocation for arbitrary shapes, according to the related art, is a Wordle word clouding method, which allows for placement of words in a 2D word cloud according to a non-deterministic time algorithm.

The Wordle word clouding method may allow for no overlap of any characters of the pace words and dense nesting of characters when adding a new word by placing the new word at a random location in the word cloud and then repeatedly moving the new word outwardly along a spiral path until the new word, as displayed by pixels, does not collide with pixels used to display any existing words. While the Wordle word clouding method works well for word clouds of less than 100 words, the method may become very inefficient for word clouds having large numbers of words, such as 500 words, because the Wordle word clouding method has a non-deterministic allocation time. Although the Wordle word clouding method uses a random time for placement of a word, by moving the new word outwardly along a spiral path the Wordle word clouding method may prevent analyzing of duplicate positions. Accordingly, the Wordle word clouding method does not provide a deterministic time for allocation.

Accordingly, there is a need for a multidimensional resource manager and/or allocator that may efficiently allocate memory resources for requests of arbitrarily shaped blocks.

SUMMARY OF THE INVENTION

Aspects of the present invention are to address at least the above-mentioned problems and/or disadvantages and to provide at least the advantages described below. Accordingly, an aspect of the present invention is to provide an apparatus and method for multidimensional resource allocation and management.

In accordance with an aspect of the present invention, a method for multidimensional resource allocation and management is provided. The method includes receiving a request for allocation of a block of a multidimensional memory resource, selecting a grid for tracking spaces of the multidimensional memory resource according to the allocation request, determining whether a block of the multidimensional memory resource corresponding to the request for the allocation of the block of the multidimensional memory resource is unallocated, and allocating the unallocated block of the multidimensional memory resource.

In accordance with another aspect of the present invention, an apparatus for multidimensional resource allocation and management is provided. The apparatus includes a memory arranged according to a multidimensional scheme having N dimensions, and a controller configured to receive a request for allocation of a block of a multidimensional memory resource, select a grid for tracking spaces of the multidimensional memory resource according to the allocation request, determine whether a block of the multidimensional memory resource corresponding to the request for the allocation of the block of the multidimensional memory resource is unallocated, and allocate the unallocated block of the multidimensional memory resource.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for multidimensional memory resource management and allocation.

Exemplary embodiments of the present invention include an apparatus and a method for managing and/or allocating multidimensional memory resources, such as a 2 Dimensional (2D) memory resource, for computer systems having a 1 Dimensional (1D) memory architecture, or in other words, for any computer system having linearly organized memory such that memory address are sequentially and linearly organized. More specifically, the present exemplary embodiments of an apparatus and a method for managing and/or allocating 2D memory resources for computer systems that perform at sub-linear time when allocating a new rectangular resource and that perform at a constant time when deallocating resources. Although the present exemplary embodiments are for a 2D memory resource for the purpose of simplicity of description, the present invention is not limited thereto, and the present exemplary embodiments may be scaled to multidimensional memory resources having more than two dimensions.

Figure 1A:
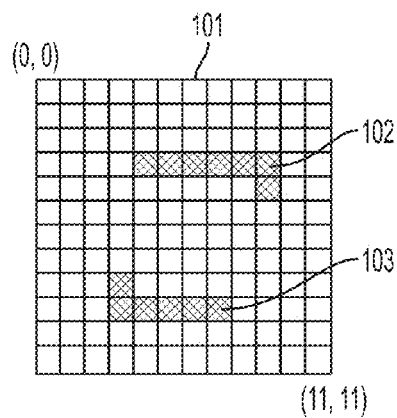
FIGS. 1A and 1B illustrate a 2 Dimensional (2D) canvas of pixels allocated according to a 1 Dimensional (1D) memory allocation scheme according to the related art.
Figure 1B:
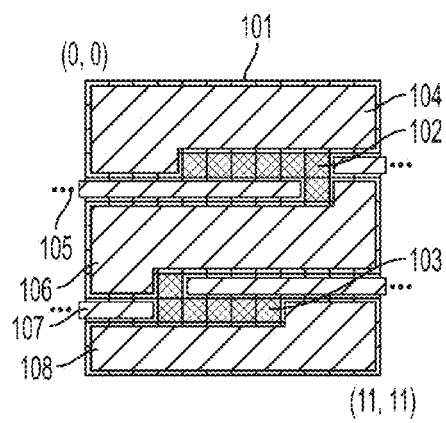
Figure 2:
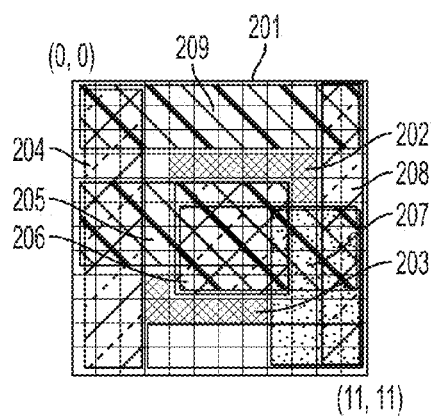
FIG. 2 illustrates allocation of blocks in a 2D memory resource according to an exemplary embodiment of the present invention.

FIG. 2 illustrates allocation of blocks in a 2D memory resource according to an exemplary embodiment of the present invention.

Referring to FIG. 2, in a case of a multidimensional resource manager and/or allocator, if an application makes a request for a block, or a memory space, having a size of W×H, then the multidimensional resource manager and/or allocator may provide a contiguous unallocated region that accommodates the size of the request if available from among the unallocated blocks 204-209, or any other unallocated blocks in a 2D canvas 201 that includes allocated blocks 202 and 203. Furthermore, in addition to providing the contiguous unallocated region, the multidimensional resource manager may allocate a region that allows for increased amounts of unallocated regions after the allocation of the contiguous unallocated region. In other words, by allocating a contiguous unallocated region, the multidimensional resource manager may preserve a greater amount and/or region of the memory for further allocation. In contrast to the Wordle word clouding method of the related art, the multidimensional resource manager may allocate the block having the size of W×H, if available, without having to perform collision evaluations to avoid overlapping resource allocations. Furthermore, the Wordle word clouding method may search for an unallocated block having the size of W×H for a non-deterministic amount of time according to the location of allocated blocks, such as the allocated blocks 202 and 203. However, the multidimensional resource manager and/or allocator used for the 2D canvas 201, as illustrated in FIG. 2, may search for an unallocated block having the size of W×H for a deterministic amount of time corresponding to the location of allocated blocks allocated blocks 202 and 203.

Figure 3:
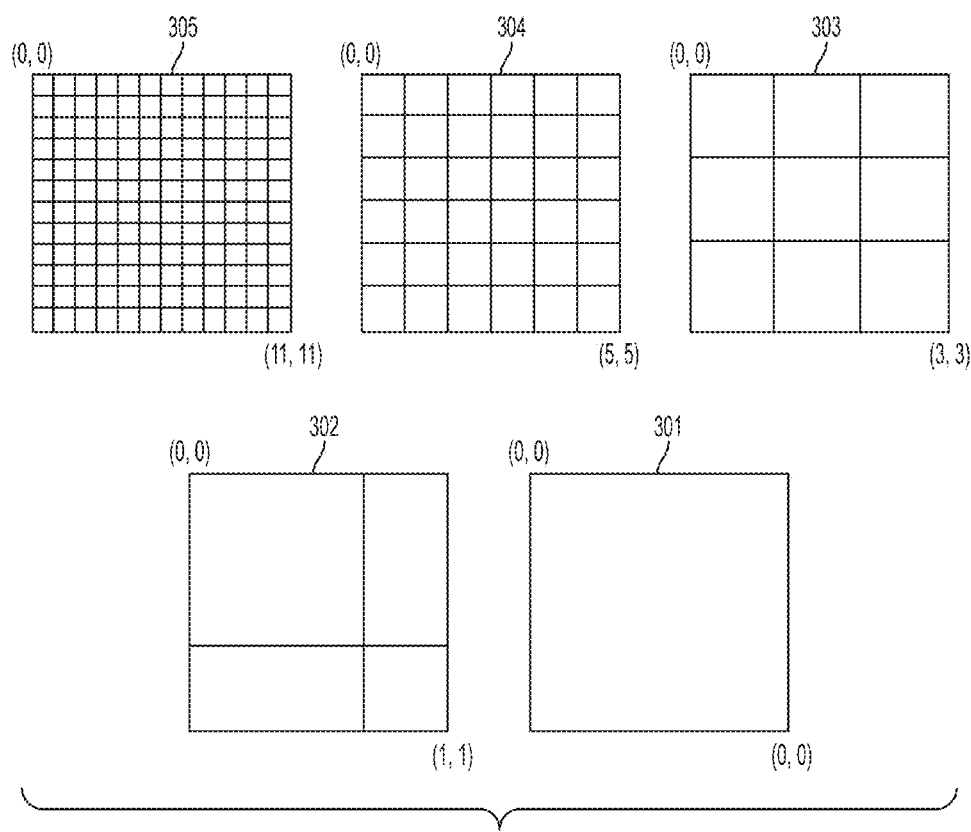
FIG. 3 illustrates a grid hierarchy of a 2D memory resource according to an exemplary embodiment of the present invention.

FIG. 3 illustrates a grid hierarchy of a 2D memory resource according to an exemplary embodiment of the present invention.

Referring to FIG. 3, the grid hierarchy of the 2D memory resource includes a series of grids 301 to 305 that are used to track 2D rectangular spaces. Although the exemplary embodiment of FIG. 3 shows the series of grids 301 to 305 as 5 grids, the present invention is not limited thereto, and any series of grids having a logarithmic hierarchy with respect to a number of cells in each of the grids of the series of grids may be used. The logarithmic hierarchy of the series of grids may be used to track 2D rectangular spaces that are unallocated. As shown in the series of grids 301 to 305, the logarithmic hierarchy includes the grid 301 having a 1×1 cell, the grid 302 having 2×2 cells, the grid 303 having 3×3 cells, the grid 304 having 6×6 cells, and the grid 305 having 12×12 cells.

Accordingly, in the exemplary embodiment of FIG. 3, each grid of the series of grids 301 to 305 doubles in size, with respect to a number of cells, as compared to a previous grid of the series of grids 301 to 305. This reduces the grid cell size by half, in each dimension, from the previous grid in the series of grids 301 to 305. Furthermore, for a series of grids, such as the series of grids 301 to 305, a size of the smallest grid, which has the least amount of cells in the grid, may be selected according to a particular application. However, with respect to the selected smallest grid cell size, which may be any grid cell size, larger grids must be kept up to or fit within, while not exceeding, the smallest grid cell size. Thus, an entirety of a canvas of pixels may fit in one cell of the grid having the smallest grid cell size.

In further detail, and according to an exemplary embodiment, a user, which may be an engineer, designer, or any other suitable person, of the multidimensional resource manager may select the smallest grid cell size to be something other than 1×1 cell, i.e., the user may select the smallest grid cell size to be 5×5 cells, for a particular application. Furthermore, the user may not select any other grid cell sizes besides the smallest grid cell size. However, the present invention is not limited thereto, and any grid cell size may be selectable according to another exemplary embodiment. Thus, after the user selects the smallest grid cell size to be 5×5 cells, there must be a grid, from among the series of grids, that has a cell size large enough to cover the entirety of a 2D resource.

For example, in a case where a 2D resource is a 240×390 pixel canvas and the user selects the smallest grid size to be 5×5 cells, then a first grid would have 5×5 cells, a second grid would have 10×10 cells, a third grid would have 20×20 cells, a fourth grid would have 40×40 cells, a fifth grid would have 80×80 cells, a sixth grid would have 160×160 cells, a seventh grid would have 320×320 cells, and an eighth grid would have 640×640 cells. The eighth grid having 640×640 cells is needed to accommodate the largest dimension of the 240×390 pixel canvas, that being 390, in order to initially manage the entirety of the 2D resource when all portions of the 2D resource are unallocated.

Each of the grids 301 to 305 may be used to track 2D rectangles, or other similar and suitable rectilinear shapes, of unallocated memory resources, i.e., blocks, whose largest dimension is less than or equal to a respective cell size of a respective one of the grids 301 to 305 while being greater one half of the respective cell size. In the exemplary embodiment of FIG. 3, the canvas is a 12×12 pixel canvas with the smallest grid cell size being the grid 301 having a 1×1 cell size, wherein the entirety of the 12×12 pixel canvas fits into the 1×1 cell of the grid 301. Accordingly, the remainder of the grids 302 to 305 have cell sizes based on the grid 301.

Figure 4:
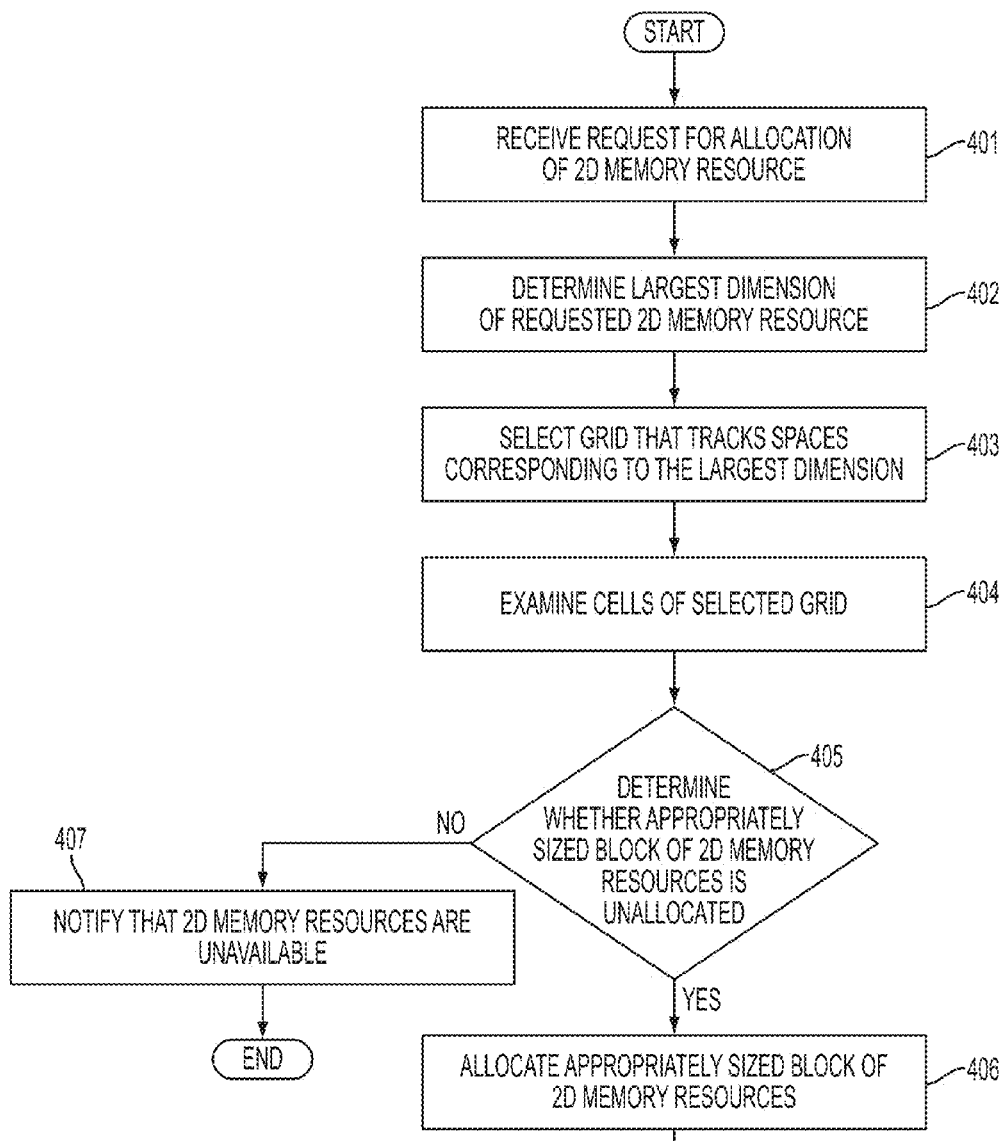
FIG. 4 is a flowchart illustrated a method for multidimensional memory resource management and allocation according to an exemplary embodiment of the present invention.

FIG. 4 is a flowchart illustrated a method for multidimensional memory resource management and allocation according to an exemplary embodiment of the present invention.

Referring to FIG. 4, a request for allocation of a 2D memory resource is received at operation 401. Next, in operation 402, a largest dimension of the requested 2D memory resource is determined. For example, if the requested allocation is for a 2D memory resource having a size of W×H, wherein W and H are integer values respectively representing a width and a height and W is greater in value than H, then the largest dimension of the requested 2D memory resource is the integer value of W. After the largest dimension of the requested 2D memory resource is determined, then, in operation 403 a grid, for example one grid from among the series of grids 301 to 305 of FIG. 3, which tracks spaces corresponding to the largest dimension is selected. Next, in operation 404 cells of the selected grid are examined. In operation 405, it is determined whether an appropriately sized block of 2D memory resources is unallocated according to the examination of the selected grid in operation 404. If it is determined that the appropriately sized block of 2D memory resources is unallocated, then in operation 406, the appropriately sized block of 2D memory resources is allocated. Otherwise, in operation 407, notification that the appropriately sized block of 2D memory resources is unavailable is provided.

Furthermore, although the exemplary embodiment of FIG. 4 is given with respect to a 2D memory resource, the present invention is not limited thereto, and the exemplary embodiment of FIG. 4 may be applied to any suitable multidimensional memory resource. Additionally, the present invention is not limited to the request of operation 401 of the exemplary embodiment of FIG. 4, and a request for a multidimensional memory resource in a specific region of a multidimensional memory may be made. In such a case, only cells of the grid that overlap with the specific region corresponding to the multidimensional memory resource request are examined in operation 404. Thus, according to an exemplary embodiment of the present invention, only a specific region of a multidimensional memory resource may be examined for determining whether the specific region has unallocated resources suitable for satisfying the multidimensional memory resource request.

Furthermore, although, in the exemplary embodiment of FIG. 4, operation 405 may be executed by a memory allocator executing the method of FIG. 4, the present invention is not limited thereto. For example, as shown in the exemplary embodiment of FIG. 4, the memory allocator may determine a sub-region of an unallocated 2D memory resource block that is to be allocated. However, the present invention is not limited thereto, and the memory allocator may also allow a requestor or user generating a request for allocation of a 2D memory resource to select the sub-region of the unallocated 2D memory resource block that is to be allocated in response to the request.

Figure 5:
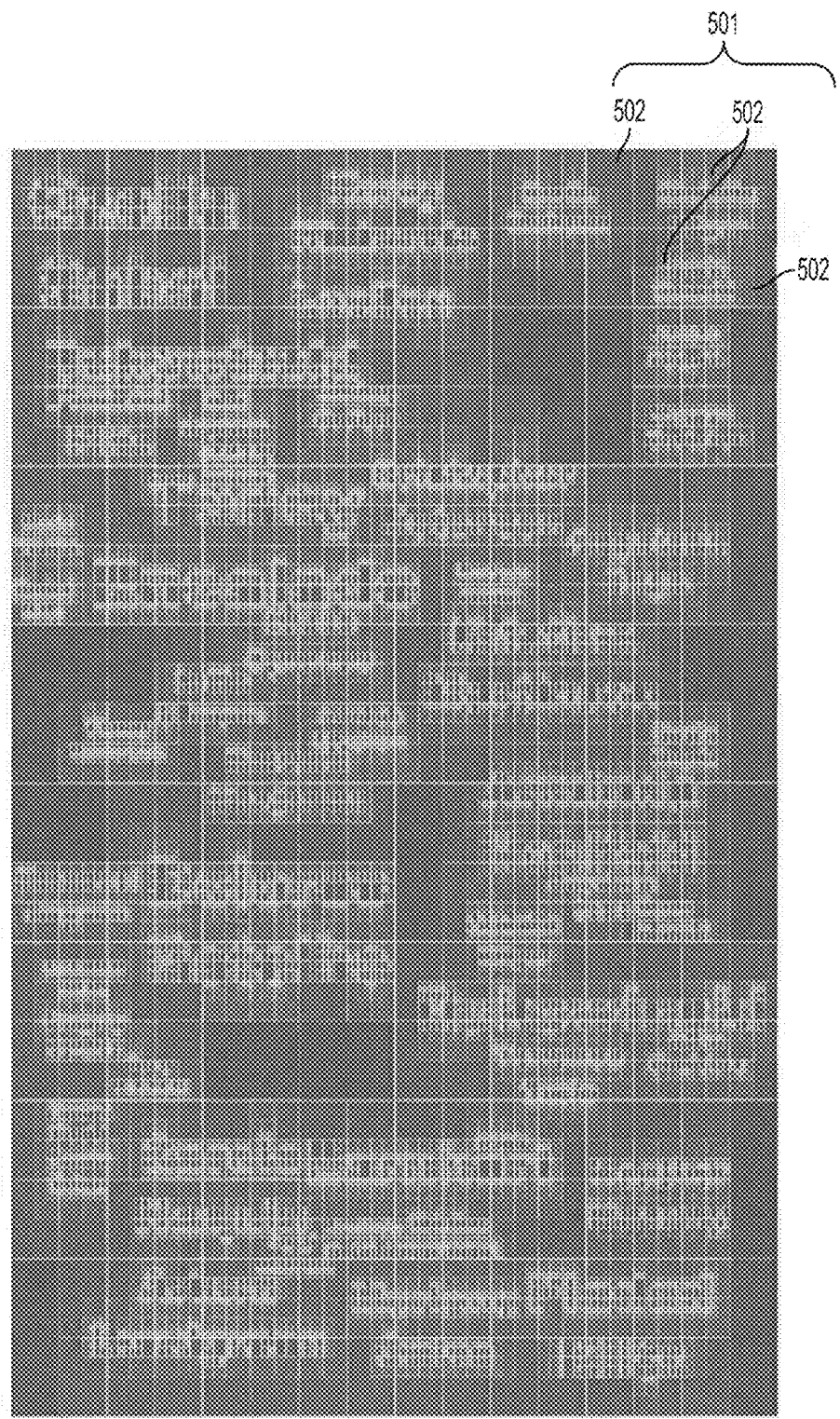
FIG. 5 illustrates hierarchical bounding volumes of consumed regions of a canvas according to exemplary embodiments of the present invention.

FIG. 5 illustrates hierarchical bounding volumes of consumed regions of a canvas according to exemplary embodiments of the present invention.

Figure 6:
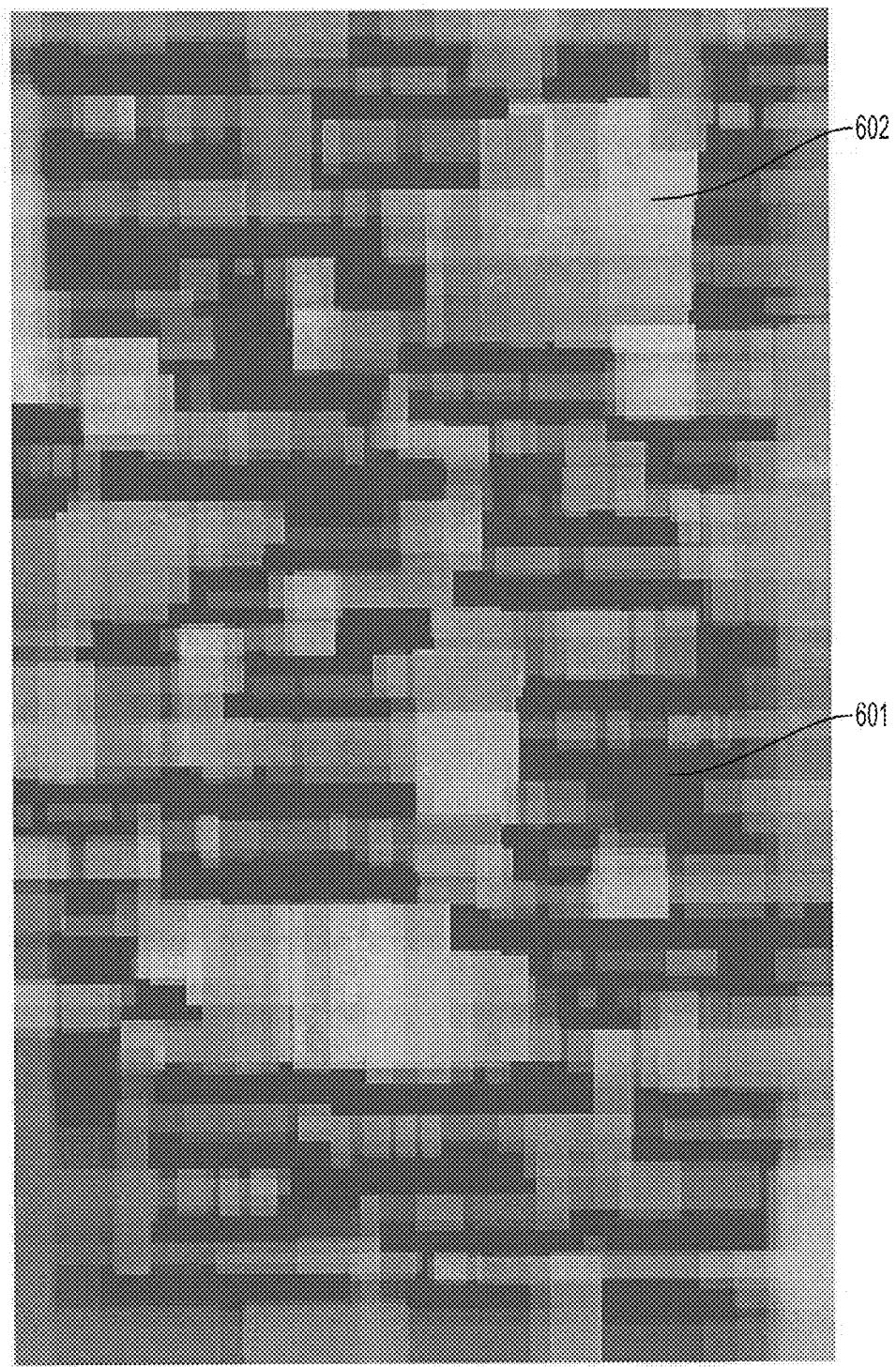
FIG. 6 is a illustrates a transparently overlapped view of grid contents according to an exemplary embodiment of the present invention.

FIG. 6 illustrates a transparently overlapped view of grid contents according to an exemplary embodiment of the present invention.

With reference to FIGS. 5 and 6, when a block of a multidimensional memory resource has been allocated, or in other words, when cells or a region of cells of a canvas of the series of grids 301 to 305 has been consumed, each grid of the series of grids 301 to 305 is examined in order to update information on which cells of each of the grids 301 to 305 is unallocated, or in other words, has available blocks or cells. More specifically, for each grid, only the cells that overlap the consumed region of cells, wherein each of the overlapping cells may be referred to as a parent 501, is broken up into four smaller regions or rectangles, each of which may be referred to as a child 502, according to the overlapping of the consumed region of cells. Each respective child 502 is compared to each parent 501 of grids other than the grid having the parent 501 of the respective child 502, starting with each parent 501 of the largest grid level, or starting with any suitable grid level, in order to determine whether the respective child 502 is contained within another parent 501. If the respective child 502 is contained within another parent 501, then the respective child 502 may be discarded. Accordingly, each remaining child 502, i.e., those that are not discarded, may be tracked in the grids that are appropriate for the size of each remaining child 502, and every parent 501 may be discarded. Accordingly, information corresponding to the transparently overlapped view of grid contents, as shown in FIG. 6, may be generated in order to show allocated regions 601, which are shown as black colored regions in FIG. 6, and unallocated regions 602, which are shown in greyscale colors other than black in FIG. 6. Accordingly, multidimensional resources may be efficiently managed and allocated.

Figure 7:
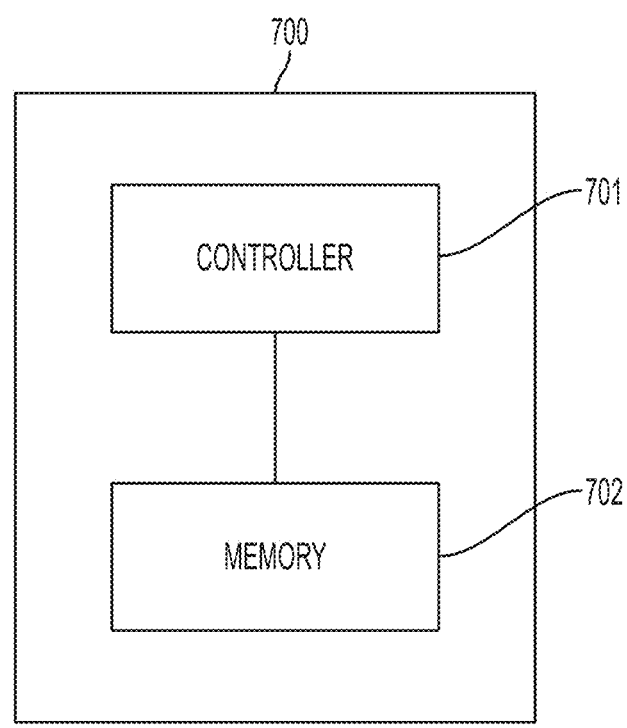
FIG. 7 illustrates an electronic device including a memory and a controller according to an exemplary embodiment of the present invention.

FIG. 7 illustrates an electronic device including a memory and a controller according to an exemplary embodiment of the present invention.

Referring to FIG. 7, the electronic device 700 may include a controller 701 and a memory 702. The memory 702 may include at least one multidimensional memory resource having a 1D memory architecture such that the memory addresses are sequentially and linearly organized. The memory 702 may be a Random Access Memory (RAM), a Read Only Memory (ROM), an optical storage device, a magneto-optical storage device, a magnetic storage device, a transistor based storage device, or any other suitable type of non-transitory computer readable storage medium. The controller 701 may be a microprocessor, a computer chip, or any other similar and/or suitable hardware element for executing the operations and features of the exemplary embodiments of FIGS. 2-6. Additionally, at least one of the controller 701 and the memory 702 may be non-transitory computer readable storage medium for storing instructions that may be used to execute the operations and features of the exemplary embodiments of FIGS. 2-6.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for multidimensional resource allocation and management, the method comprising:
   receiving an allocation request of a block of a multidimensional memory resource comprising a series of grids, each grid comprising a plurality of cells of given dimensions with a given size on each dimension, each cell of each grid being a multidimensional memory resource having identical size on each dimension;
   selecting a grid among the series of grids according to the allocation request;
   examining cells of the selected grid to determine whether the cells are one of allocated and unallocated;
   determining whether an appropriately sized block of cells of the multidimensional memory resource within the selected grid is unallocated;
   allocating the determined block of unallocated cells of the multidimensional memory resource;
   marking the allocated cells in the selected grid as allocated; and
   tracking unallocated spaces of the multidimensional memory resource by marking the corresponding cells in the selected grid as unallocated.

2. The method of claim 1, wherein the selecting of the grid comprises determining a size of the largest dimension of the requested multidimensional memory resource.

3. The method of claim 2,
   wherein the requested multidimensional memory resource has N dimensions, and
   wherein each of the N dimensions has a size that is an integer value.

4. The method of claim 1, further comprising notifying that the requested multidimensional memory resource is unavailable if it is determined that the appropriately sized block of unallocated cells of the multidimensional memory resource does not exist.

5. A non-transitory computer-readable recording medium having recorded thereon a program for executing the method of claim 1.

6. An apparatus for multidimensional resource allocation and management, the apparatus comprising:
   a memory arranged according to a multidimensional scheme having N dimensions; and
   a controller configured to:
      receive an allocation request of a block of a multidimensional memory resource comprising a series of grids, each grid comprising a plurality of cells of given dimensions with a given size on each dimension, each cell of each grid being a multidimensional memory resource having identical size on each dimension,
      select a grid among the series of grids according to an amount of memory requested in the allocation request,
      examine cells of the selected grid to determine whether the cells are one of allocated and unallocated,
      determine whether an appropriately sized block of cells of the multidimensional memory resource within the selected grid is unallocated,
      allocate the determined block of unallocated cells of the multidimensional memory resource,
      mark the allocated cells in the selected grid as allocated, and
      track unallocated spaces of the multidimensional memory resource by marking the corresponding cells in the selected grid as unallocated.

7. The apparatus of claim 6, wherein the controller is configured to determine a size of the largest dimension of the requested multidimensional memory resource when selecting the grid.

8. The apparatus of claim 7,
    wherein the requested multidimensional memory resource has N dimensions, and
    wherein each of the N dimensions has a size that is an integer value.

9. The apparatus of claim 6, wherein the controller is configured to notify that the requested multidimensional memory resource is unavailable if it is determined that the appropriately sized block of unallocated cells of the multidimensional memory resource does not exist.

\* \* \* \* \*